Patented Aug. 11, 1931

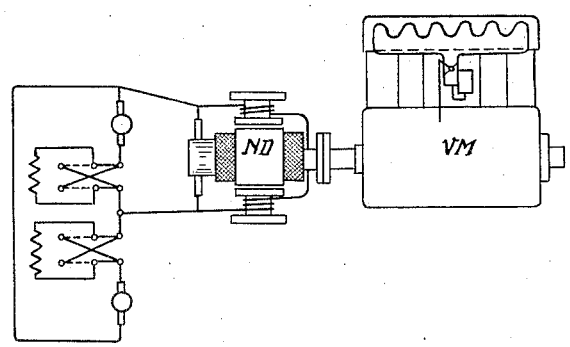
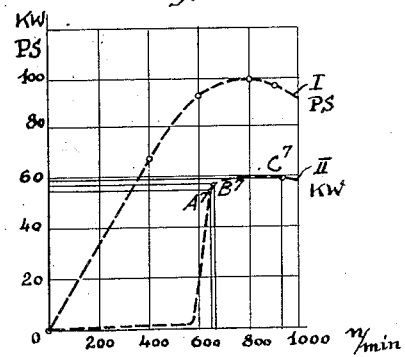
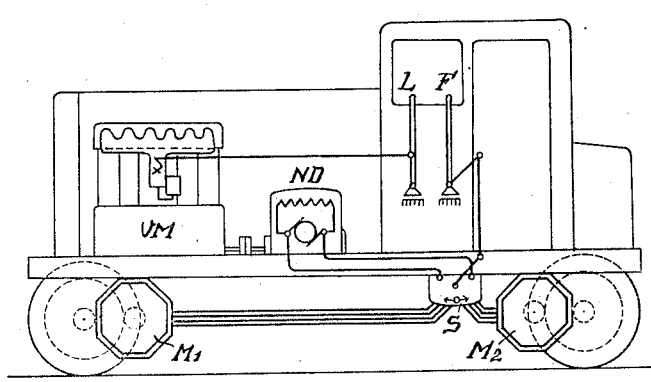
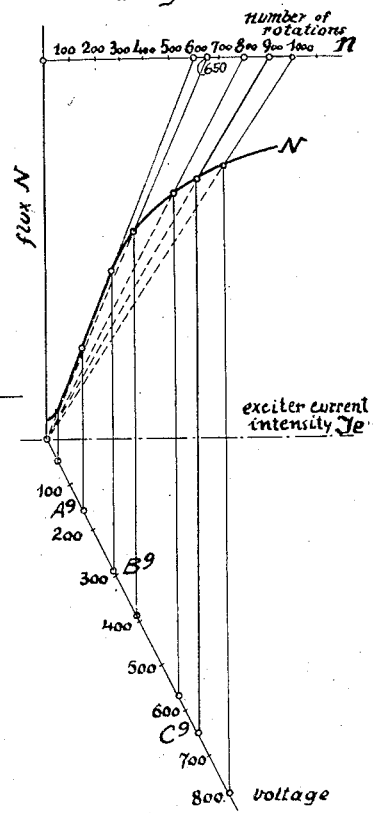
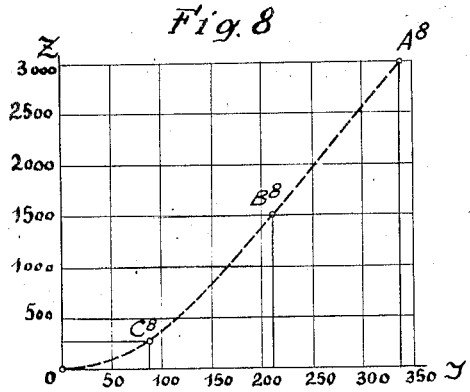

1,818,877

UNITED STATES PATENT OFFICE

OTTO ZADNIK, OF VIENNA, AUSTRIA

ELECTRIC POWER TRANSMISSION WITH AUTOMATIC EFFICIENCY REGULATION FOR VEHICLES

Application filed March 24, 1927, Serial No. 178,099, and in Austria April 2, 1926.

I have filed applications in Austria on 2nd April 1926 and in Germany 11th September 1926.

This invention relates to an electrical power transmission means for vehicles driven by heat engines, and comprises a prime mover coupled to a self-excited generator or to a generator with exciter, the magnetic circuit of the generator remaining unsaturated throughout its working speed range so that it operates always on the inclined or unstable part of its characteristic. The power-speed characteristic of the prime mover is adapted to the characteristic of the generator so that, while the power output of the generator remains constant in accordance with the power supplied to it by the heat engine, the voltage which it generates varies inversely with the current consumed by the motor or motors which it supplies.

The well-known fact that a shunt-wound dynamo almost entirely loses its voltage when it runs at a low speed has already been utilized for electrical power transmission, as for stopping and starting vehicles without disengaging the connection between the dynamo and the motors. However, in devices of this kind, the dynamo does not normally work on the lower, inclined part of its characteristics, and a series-parallel connection of the motor is ordinarily employed for their regulation. The present invention employs for normal working, and for the purpose of obtaining constant power, just that speed at which the shunt-wound or separately excited dynamo loses its voltage.

The essential advantage of the present invention lies in the fact that the control of the power output is effected solely by varying the power supplied by the prime mover, for instance by varying the fuel-supply of an internal combustion engine, any control of the dynamo excitation (for instance by hand with an adjustable resistance or automatically from the traction-motor current by differential compounding), being dispensed with, so that such control devices are not necessary. Further advantages of the invention are that the prime mover is protected against overloading or unfavorable utilization, and that the driver, whose attention is fully taken up by the track on which the vehicle travels, only has to operate the gas mixture control lever.

Various modes of carrying out the present invention are diagrammatically illustrated by way of example in the accompanying drawings, in which:—

Figure 1:
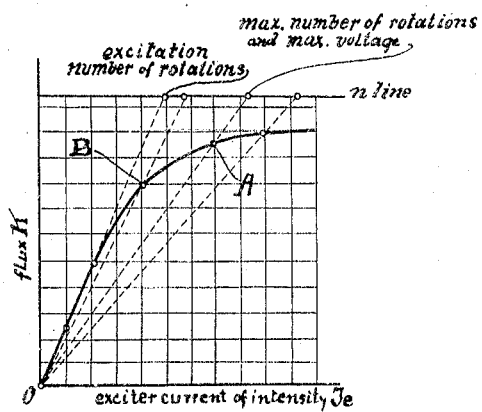
Figure 3:
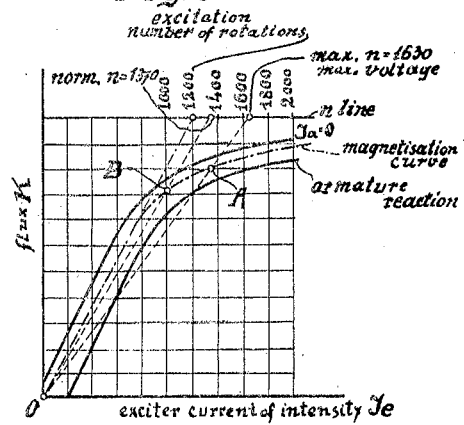
Figure 2:
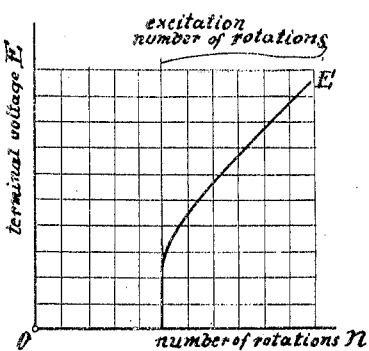
Figure 4:
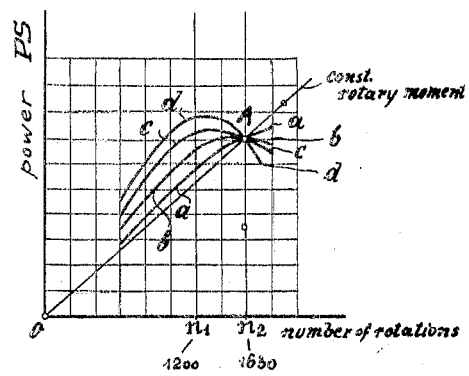

Fig. 1 shows a theoretical magnetization curve of a shunt-wound machine,

Fig. 2 a curve indicating the relation between the number of revolutions and the voltage, Fig. 3 illustrates the actual magnetization curve obtained under the influence of residual magnetism and armature reaction, Fig. 4 shows a number of output curves of the prime mover depending on the number of revolutions, Fig. 5 shows the arrangement of the connections of the set installed on an electric railway locomotive, Fig. 6 is an elevation of the set, showing the arrangement of the connections on an electric railway locomotive, Fig. 7 shows the actual output-speed curve of the prime mover and the output yielded by the dynamo coupled to this prime mover, Fig. 8 is the curve of tractive effort at the periphery of the driving wheel in relation to the current supplied by the dynamo, and, Fig. 9 is the curve showing the relation between the speed of the generating set and the voltage of the dynamo.

As mentioned above, Fig. 1 shows the theoretical magnetization curve of a shunt-wound dynamo with small residual magnetism. It is well known, that such a machine is not excited below a certain minimum speed which depends upon the constants of the machine.

The following relations exist:—

$$K = k_1 Ie; \quad Ie = \frac{k_2 E}{We}; \quad E = k_2 Kn,$$

therefore $$K = \frac{k_1 k_2}{We} Kn,$$

and thus $n = \frac{We}{k_1 k_2}$ = minimum number of revolutions required for excitation.

The symbols in the above equations have the following meanings:

$K$ = machine field flux,
$Ie$ = exciter current
$We$ = resistance of the exciter circuit,
$E$ = terminal voltage,
$n$ = number of revolutions,
$k_1, k_2$ = constants.

Fig. 2 illustrates the relation between the number of revolutions and voltage as derived from Fig. 1. It will be seen that the terminal voltage falls with a reduction of the number of revolutions, at first substantially in proportion to the reduction in speed, but afterwards, when it comes near the minimum exciting speed, much more quickly, and at last suddenly.

Fig. 3 shows the modification of the theoretical curve of Fig. 1 under the influence of residual magnetism and armature reaction weakening the field. The remanence obliterates the pronounced excitation limit, whereas the armature reaction, which in the case of generators, mostly weakens the field, has the opposite effect, depending upon the current. By constructing the machine in a suitable manner, as, for example, by providing a comparatively large air gap and also a slightly strengthening compound winding the magnetization curve shown in dot-and-dash lines is obtained. The exciting speed is indicated in dot-and-dash lines.

Conditions are similar in a power transmission comprising a prime mover coupled to a generator with exciter in which the magnetic circuit of the exciter remains unsaturated throughout its working speed range so that the exciter always operates on the inclined or unstable part of its characteristic. However, in this case the excitation curve of the exciter must be determined for a certain external resistance and the magnetic circuit of the main generator itself has to be of sufficiently large dimensions.

An electrical power transmission according to the invention operates in the following manner:—

When travelling on a level track, the machine operates at point A of Fig. 3 with the maximum number of revolutions and the maximum voltage. If the prime mover produces a constant torque independently of the number of revolutions, the number of revolutions and the power output will drop at first if the train resistance increases. For instance, speed and output will drop down to point B, from $n=1630$ to $n=1370$. In case the train resistance is further increased, and with it also the consumption of current, the dynamo can respond with only a small drop in speed and therefore in the power output, as it comes into the vicinity of the minimum exciting speed. Thus in such a machine the number of revolutions and therefore also the power output remain substantially constant from a certain load, the value of which depends upon the design of the dynamo, especially upon the degree of saturation of its magnetic circuit.

The automatic power-regulation of the dynamo is also adapted to the power-speed curve of the prime mover, the torque of which generally varies considerably with the number of revolutions, in such a manner that the drop in the number of revolutions, depending on the dynamo characteristic, causes only a small output drop, and may even cause an increase of the output or cause the prime mover to work most economically at normal running conditions.

Fig. 3 shows that there is a maximum drop in the speed from $n=1630$ to $n=1200$ from the load condition represented by point A to the point of substantially constant speed below point B. The designer of the prime mover can vary the power curve at will as shown by the curves $a$, $b$, $c$ and $d$ in Fig. 4, by varying for instance the valve gear and the cylinder volume of an internal-combustion engine, the power output at the point A remaining the same. The curve $a$ has a substantially constant torque, and shows a power drop of about 18½% from $n=1630$ to $n=1200$. The curve $b$, corresponding to an ordinary gasoline motor, shows a power drop of about 8%, curve $c$ shows an increase of power of about 2%, and the prime mover represented by the curve $d$ works at $n=1200$ just at the point of maximum output, and therefore, in the case of a required high tractive effort, with an output increase of 17% as compared with the normal output. Thus, notwithstanding a variable prime mover speed, the output is maintained constant by adapting the dynamo characteristic to the power-speed curve of the prime mover.

As contrasted with other systems, the present invention also ensures automatic regulation of power in the event of the prime mover not yielding the full power, in consequence either of defective operation or of intentional throttling, the output being kept substantially constant at a speed in the neighborhood of the exciting speed. Consequently the invention offers two further advantages:—

(1) By simply setting the throttle lever it is possible to obtain different constant power outputs according to number and weight of the cars in order to keep to the time table.

(2) In the case of a throttled output a reduced speed of the prime mover is automatically maintained, whereby the durability and the security of operation are increased.

By varying the excitation resistance it is possible to reduce the exciting speed, according to the equation $$n = \frac{We}{k_1 k_2},$$

in case only a small power output is required of the machine.

Thus the invention relates to a method of obtaining automatic power regulation in the case of an electric power transmission, by employing a self-excited shunt dynamo or a generator set with exciter, the machines having substantially straight characteristics. The unstable voltage, obtained thereby, which careful efforts have hitherto been made to obviate by special constructions, such as regulating poles, separate excitation and compounding, is utilized for keeping the power practically constant at a practically constant speed and prevents the occurrence of a torque which is too great for the prime mover and may cause a drop in the working speed, not only at full load, but also at any partial load. As has been shown, it is possible with the present invention to obtain a more extensive automatic power-regulation, by utilizing the drop in speed from the maximum voltage to the excitation limit, the power-speed curve of the prime mover and the dynamo characteristic being adjusted with respect to each other.

Figs. 5 and 6 show the arrangement of the connections in the case of a locomotive load of 50 tons and also the arrangement of the locomotive. The internal-combustion engine VM drives a shunt-wound dynamo ND, the output of which is supplied to the two traction motors $M_1$ and $M_2$, a switch S being employed for changing the direction of rotation. The attendance is reduced to a minimum, because after determining the direction of travel with lever F it is only necessary to set the power output of the engine by means of the lever L, in order to maintain the schedule with a reduced train load, while the electrical regulation is carried out quite automatically.

In Fig. 7 the curve I (taken at full throttle opening) represents the effective power of the internal-combustion engine plotted over the number of revolutions, and the curve II shows the kilowatts available. This curve starts at 600 revolutions per minute, because the dynamo only becomes excited at that number of revolutions.

The curve of Fig. 8 shows the tractive effort Z at the periphery of the wheel in relation to the current J of the dynamo. from this curve result the following relations:

(Train resistance on the level:
    6 kg./t.   Z=300 kg.   J=90 amperes.)
(Upward gradient resistance:
    30 kg./t.   Z=1500 kg.   J=210 amperes.)
(Starting on an upward gradient:
    60 kg./t.   Z=3000 kg.   J=340 amperes.)

Fig. 9 illustrates the relation between the speed $n$ and the terminal voltage V based on the magnetization and voltage curves N and V at full load. As the graphs show, to a voltage of 650 volts, for instance, are accorded 900 revolutions per minute.

With the aid of the curves it can be proved that the train has an automatically constant power output for all travelling resistances from 3000 kg. to 300 kg., that is, from starting on the steepest upward gradient to travelling on a level track.

The operation is as follows:—

If it is desired to start the train, the power lever L is slowly moved in the direction of the "full load" position. The speed of the generator set increases, the dynamo excites and supplies the current required for starting the traction motors, in order to start the train with the desired acceleration. The internal-combustion engine then makes about 600 revolutions per minute and rapidly reaches the full power output of 55 kilowatts (Fig. 7, point $A^7$). If the traction force is 3000 kg., the generator current is 340 amperes (Fig. 8, point $A^8$) at about 162 volts (Fig. 9, point $A^9$). From now on, any regulation of the voltage is carried out quite automatically in consequence of the dynamo characteristic being adapted to the power curve of the internal combustion engine. For instance, if the tractive force has dropped to 1500 kg. corresponding to 210 amperes (Fig 8, point $B^8$), the number of revolutions has risen to 650, the output to 57 kw. (Fig. 7, point $B^7$) and the voltage to 271 volts (Fig. 9, point $B^9$). On the level track the tractive force drops to 300 kg., and the current to 90 amperes (Fig. 8, point $C^8$). In consequence of this reduction of tractive force the speed of the internal-combustion engine mounts up to about 900 revolutions per minute, whereby a voltage of 650 volts (Fig. 9, point $C^9$) and an output of 59 kw. (Fig. 7, point $C^7$) is reached.

The above example shows that the power is automatically kept substantially constant and an overloading of the internal-combustion engine is prevented by adapting the characteristic of the electric generating-unit to the power-speed curve of the internal-combustion engine, the unstable condition of excitation of a dynamo being utilized, with the simplest control.

Having now described my invention, what I claim is:

1. The combination with an internal combustion engine, of a self-excited electric generator coupled thereto, and a motor electrically connected with said generator, said generator being so designed that its magnetic circuit remains unsaturated throughout the speed range at which said generator may be driven by said internal combustion engine to drive said motor, whereby the generator operates upon the unstable part of its characteristic and while its power output remains constant the voltage which it generates varies in inverse proportion to the load current of said motor.

2. The method of regulating an electric power system comprising an internal combustion engine having a throttle, a generator of larger output capacity than said engine, and a motor of such capacity that it will absorb the full output of said engine throughout the normal speed range of the engine operation under various throttle settings, which consists in changing the throttle setting through a wide range and driving said generator in such a way that its flux does not rise substantially beyond the unstable part of its flux-exciting current curve as the setting of the throttle is varied throughout said range, whereby the system is, for any one setting the throttle within said range, always in such condition that the voltage of the generator will be changed by variation of the tractive force in such a way as to maintain a constant load on the internal combustion engine.

3. The combination with an internal combustion engine, of an electric generator coupled thereto, and a motor electrically connected with said generator and capable of translating the engine output over the normal range of operation, said generator being of such larger output capacity than the output capacity of said combustion engine that, while the output of said engine remains constant, the voltage of said generator varies in inverse proportion to the load current.

4. The combination with an internal combustion engine, of an electric generator coupled thereto, and a motor electrically connected with said generator, said generator being so designed that its magnetic circuit remains unsaturated throughout the speed range at which said generator may be driven by said internal combustion engine to drive said motor, whereby the generator operates upon the unstable part of its characteristic and while its power output remains constant the voltage which it generates varies in inverse proportion to the load current of said motor.

In testimony whereof I affix my signature.

OTTO ZADNIK.